United States Patent [19]

Cargill

[11] Patent Number: 5,443,586
[45] Date of Patent: Aug. 22, 1995

[54] CARGO RESTRAINT APPARATUS FOR A PICK-UP TRUCK

[75] Inventor: Lee B. Cargill, Coronado, Calif.

[73] Assignee: Enel Company, Coronado, Calif.

[21] Appl. No.: 270,767

[22] Filed: Jul. 5, 1994

[51] Int. Cl.⁶ .............................................. B60P 7/08
[52] U.S. Cl. ..................... 410/143; 410/129; 410/121; 296/37.5
[58] Field of Search ............. 410/117, 118, 142–144, 410/140, 145–151, 129, 89, 121; 296/37.6, 37.5, 39.2; 220/531, 534, 557, 529; 211/123, 195, 184

[56] References Cited

U.S. PATENT DOCUMENTS

| | | | |
|---|---|---|---|
| 1,721,563 | 7/1929 | Kupelian | 410/140 |
| 2,697,631 | 12/1954 | Miller | 410/140 |
| 3,438,673 | 4/1969 | Nelson | 410/117 X |
| 4,078,836 | 3/1978 | Wilson | 410/143 X |
| 4,124,136 | 11/1978 | Brelland et al. | 410/129 X |
| 4,637,763 | 1/1987 | Van Iperen | 410/150 X |
| 4,650,383 | 3/1987 | Hoff | 410/150 X |
| 4,772,165 | 9/1988 | Bartkus | 410/145 X |
| 5,018,918 | 5/1991 | Jacobs et al. | 410/143 X |
| 5,092,504 | 3/1992 | Hannes et al. | 224/42.45 R |
| 5,139,375 | 8/1992 | Franchuk | 410/105 |
| 5,186,513 | 2/1993 | Strother | 296/100 |
| 5,186,587 | 2/1993 | Moore | 410/118 |
| 5,253,913 | 10/1993 | Metivier | 296/37.6 |

FOREIGN PATENT DOCUMENTS 4015556  11/1990  Germany .............. 296/37.5

*Primary Examiner*—Michael S. Huppert
*Assistant Examiner*—Stephen Gordon

[57] ABSTRACT

A multi-purpose cargo restraint apparatus that attaches to the top of cargo bed side rails of a pick-up truck and that is collapsible for stowage behind the truck driver's seat. The apparatus features five ways of restraining cargo: a collapsible cross beam assembly that spans the width of the truck cargo bed and that can be positioned to restrain the movement of large cargo items; tie down eye bolts near the side rails to attach cargo restraining lines; tie down bolts near the center of the cross beam assembly to attach additional lines or for restraining pets on a leash; a net or series of lines or the like, suspended between two vertical posts attached beneath the cross beam assembly for restraining the fore or aft movement of small cargo items; and a restraint for bicycles.

1 Claim, 2 Drawing Sheets

CARGO RESTRAINT APPARATUS FOR A PICK-UP TRUCK

BACKGROUND OF THE INVENTION

1. Field of the Invention

The present invention relates to the restraint of cargo that is transported in the cargo bed of a pick-up truck, and, specifically to a novel multi-purpose apparatus that is attachable to the top of cargo bed side rails that can be used to restrain a variety of types of common cargo.

2. Description of Prior Art

A variety of devices have been invented over the years that can be attached to the cargo bed of pick-up trucks that increase truck utility. Franchuk (U.S. Pat. No. 5,139,375) discloses an adjustable mounting system to which eleven separate accessories can be attached. Hannes et al (U.S. Pat. No. 5,092,504) discloses a bicycle rack that is mounted to the cargo bed side rails of a pick-up truck. Strother (U.S. Pat. No. 5,186,513) discloses a soft-shell cover for a pick-up truck that has a support structure that can be disassembled to fit in a bag for stowage when not in use. Although the prior art demonstrate the utility of a variety of accessory products, each with a unique feature or approach to restrain or protect cargo, they do not attempt to provide in a single stowable apparatus, a multi-purpose device that is suitable for restraining a wide variety of common cargo. It is this unmet need that the present invention fills.

OBJECTS OF THE INVENTION

The broad object of this invention is to provide an apparatus that can be used to restrain a wide variety of types of cargo transported in the bed of a pick-up truck.

A further object of the invention is to provide an apparatus that is collapsible, mid that when collapsed, fits in a cloth bag that is storable behind the driver's seat of a pick-up truck.

A further object of the invention is to provide an apparatus that is easy to install and remove, requiring no tools but accommodating common tools.

A further object of the invention is to provide an apparatus that can be manufactured at low-cost by virtue of a simple design thereby making the apparatus a commercially inexpensive and viable product.

SUMMARY OF THE INVENTION

The present invention provides a cargo restraining apparatus that attaches to the top of the cargo bed side walls of a pick-up truck and that is collapsible for stowage in a cloth bag for placement behind the driver's seat when not being used. The apparatus features five ways of restraining cargo. It consists fundamentally of a collapsible cross beam assembly that spans the width of the cargo bed of a pick-up truck. The cross beam assembly is made up of two beam halves connected at the center. This connection can be either a hinge with a latch or strap fastened to the side opposite the hinge to lock the two beam halves together, or the beam halves can be connected together with braces that are bolted together, or the bean halves can be fabricated so as to mate together at the center of the combined beam span. The cross beam can be used to restrain the fore and aft movement of large cargo items such as appliances, furniture, wardrobe boxes, etc.. The cross beam assembly has provisions for attaching the following additional devices for restraining a variety of types of cargo:

eyebolts at either end of the cross beam assembly, near the side rails, to provide additional tie down points for cargo.

one or two eyebolts positioned near the center of said cross beam assembly, the eyebolt/s serving as additional tie down points for cargo or for attaching a leash to restrain a pet animal such as a dog, one or more bicycle attachment devices consisting of either parallel plates/rods between which a bicycle frame is placed and then secured to that position with lines, straps, stretch cords or the like, or a device to which the front tire fork of a bicycle is secured, either device used in combination with additional tie down lines, and a net or series of restraining lines or the like, suspended between two vertical posts that are connected to and positioned below the cross beam assembly for restraining small items of cargo such as grocery bags, small boxes or the like.

The apparatus, when collapsed, is placed in a cloth bag and is stowable behind the driver's seat for easy access when needed. The apparatus can be removed frown the bag and installed on the cargo bed side rails by an individual in a few minutes. Hand tightening of eyebolts and wing nuts can be accomplished without the use of any tools and would be satisfactory for most cargo loads. Further tightening of the bolts with common tools can be accomplished to provide an increased restraint capability for large/heavy loads.

The apparatus is connected at the end of the beam to the cargo bed side rail be means of hooks, bolts, clamps, or the like.

BRIEF DESCRIPTION OF THE DRAWINGS

The present invention will be more fully understood by reference to the following detailed description thereof when read in conjunction with the attached drawings, and wherein.

DESCRIPTION OF THE PREFERRED EMBODIMENT

Figure 1:
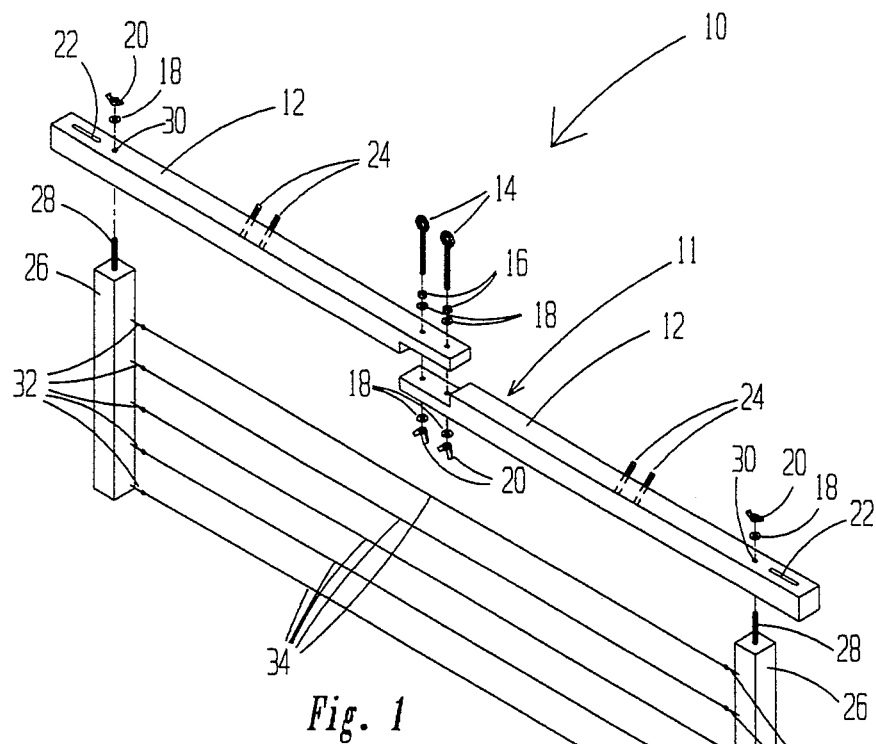
FIG. 1 is a perspective partial exploded view of the cargo restraint apparatus.

Referring to FIG. 1, the cargo restraint apparatus 10 has a cross beam assembly 11, the most basic form of the apparatus, consisting or two cross beam halves 12 that join at the center and are bolted together with eye bolts 14, hex nuts 16, flat washers 18, and wing nuts 20 in the configuration shown and to which additional devices can be attached to restrain cargo. The joining of the beam halves could also be accomplished using a hinge with opposing strap/latch, or braces, or any number of joining methods. Elongated slots 22 are provided near the outboard ends of the assembly 11 through which protrude fastening devices such as described in my co-pending patent application Ser. No. 08/265,128, (patent pending) filed on Jun. 24, 1994 entitled, Cargo Restraint Anchor Device for Pick-up Trucks, that connect the ends of the cross beam assembly to the side rails. The elongated slots accommodate a degree of variation in pick-up truck side rail dimensions. Two fundamental sizes are envisaged for the cargo restraint apparatus; one size for small trucks. and one size for large trucks. The one-size-per-class design allows for manufacturing cost reduction. Bicycle attachment devices 24 are connected to the crossbeam assembly 11 thus making the apparatus a low cost bike rack. The bicycle attachment devices shown are threaded rods that are screwed into the beam at a 45 degree angle from the vertical when viewed from file side (looking from the end of the cross beam assembly). This provides a very low cost approach to a bicycle restraint. Simple metal brackets could also be used (not shown). Commercially available devices that clamp onto the front wheel fork of a bicycle could also be attached to the cross beam assembly. Vertical posts 26 are attached near the ends and below the cross beam assembly. As shown, the top end of each vertical post is connected to the cross beam assembly by means of a threaded rod 28 that is screwed into the vertical post, protrudes through a hole 30 in the cross beam and is fastened by a washer 18 and wing nut 20. Eye screws 32 are fastened to each vertical post 26 as shown. Stretch cords 34 span the distance between opposing eye screws, the purpose of which is to form a barrier that restrains small packages from moving either fore or aft in the cargo bed. A continuous line or stretch chord or net or the like could also be suspended between the eye screws as alternate forms of the barrier. It is envisaged that the most common placement of the barrier would be approximately 18 inches aft of the forward bulkhead of the cargo box to restrain common items such as grocery bags, small boxes and the like.

FIG. 1 shows both the cross beam halves 12 and the vertical posts 26 having a square cross section, when viewed from the ends of the long axis of each. This is only shown for purposes of instruction and is not intended to be exhaustive or to limit the invention to the precise form disclosed. It is obvious to one skilled in the art that other cross section shags can be used such as a channel, a hollow square, hollow or solid circle, L-shape, etc.. The method of joining of the cross beam halves to each other and the joining of the vertical posts to the cross beam could also take many forms.

Figure 2:
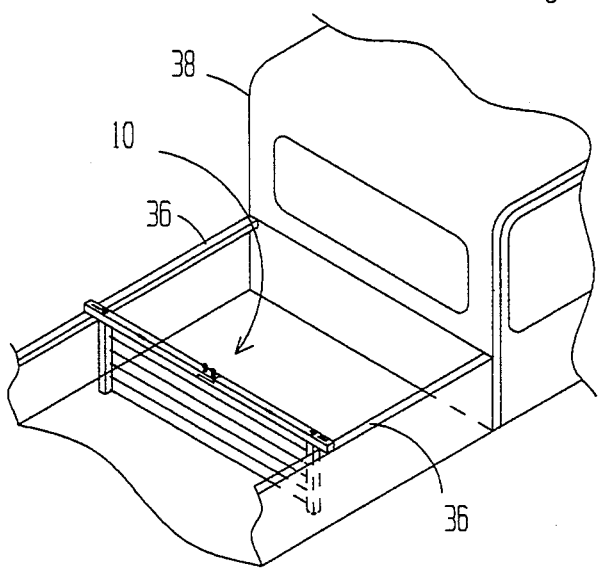
FIG. 2 is a perspective drawing showing the relationship of the cargo restraint apparatus to the cargo bed side rails of a pick-up truck.

FIG. 2 illustrates the cargo restraint apparatus 10 secured to the side rails 36 of a pick-up truck 38 and is provided to show the general spanwise positioning of the apparatus. Depending on the specific attachment device used to connect the ends of the cross beam to the side rails, the cross beam assembly can be positioned at a variety of fore and aft positions along the side rail, or the cross beam assembly can be fixed at a particular position (i.e., at a stake hole located in the side rail).

Figure 3:
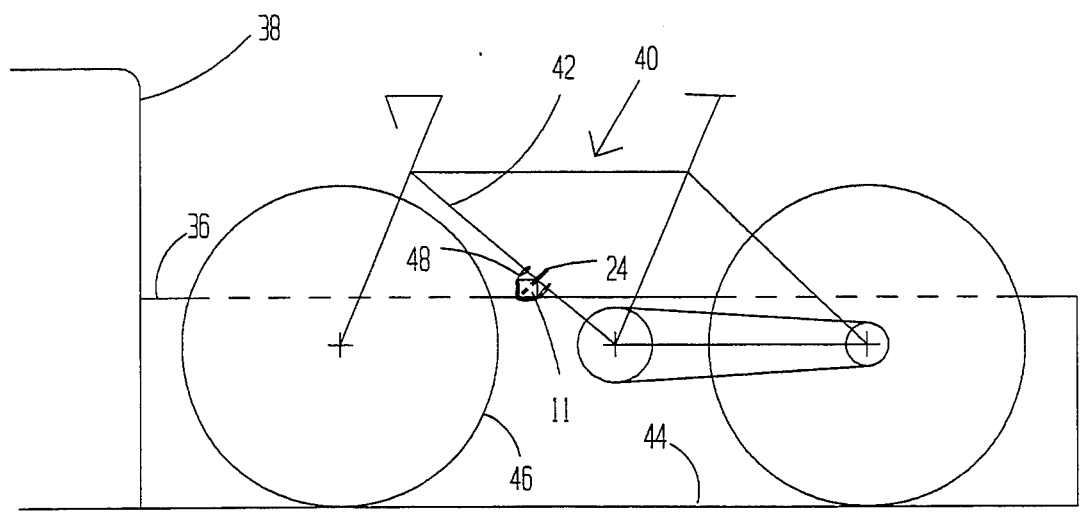
FIG. 3 is a side elevation of the interior of a pick-up truck cargo box, as viewed from the left side, showing the interface of a bicycle to the cross-beam of the cargo restraint apparatus.

FIG. 3 is a side elevation of the interior of the cargo box as viewed from the left side of a pick-up truck 38, showing the placement of a bicycle 40 with respect to the cargo bed 44 of the truck, the relationship of the cross beam assembly 11 to the side rail 36, and the interface of a bicycle frame 42 with respect to the crossbeam assembly 11 and the bicycle attachment device 24. The vertical posts and small package barrier previously described in FIG. 1 are not shown in FIG. 3 and in practice would probably not be attached when the apparatus is used in the bike rack mode. The weight of the bicycle is supported by the truck bed 44. The bicycle is positioned for attachment by lowering it from above so that the cross beam assembly 11 is positioned between bicycle frame 42 and front wheel tire 46 with the frame placed between the brackets of the bicycle attachment device 24. A line 48 or stretch cord or strap or the like is wrapped around the cross beam and bicycle frame as shown to restrain the fore and aft movement and the vertical movement of the bicycle. Side motion of the bike frame is restrained by the bicycle attachment device 24. The front wheel of the bicycle would be aligned to the bicycle frame with a stretch cord or the like connecting the front wheel to an aft section of the bicycle frame.

Figure 4:
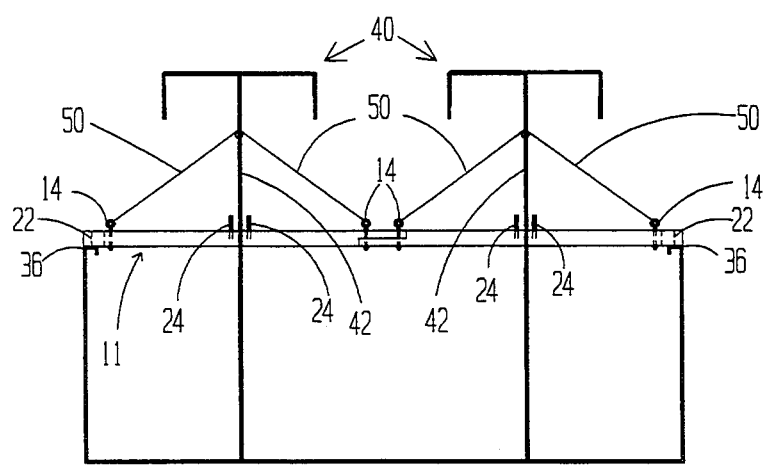
FIG. 4 is a cross section of the cargo box of a pick-up truck, as viewed from the rear, showing the interface of two bicycles to the cross-beam of file cargo restraint apparatus.

FIG. 4 is a cross section of the cargo box of a pick-up truck, as viewed from the rear, showing two bicycles 40 attached to the cargo restraint apparatus, and shows tie down lines 50 used to further restrain a bicycle, preventing my tipping motion to the side. The line that restrains the fore and aft motion of the bicycle (FIG. 3, detail no. 48) is not shown in FIG. 4. The cross beam assembly 11 spans the width of the cargo bed, is secured to the side rails 36 and has bicycle attachment devices 24 attached to it. The bicycle frames 42 are positioned as shown. Eye bolts 14 function as tie down anchors for the tie down lines 50. The tie down lines can be stretch cords or lines or straps or the like. They not only directly prevent bike tipping through tension in the lines; they also contribute to the prevention of tipping by forcing a bicycle downward against the cargo bed thereby increasing the friction between the bicycle tires and the bed or the truck.

I claim:

1. A multi-purpose cargo restraint apparatus in combination with a pick-up truck including a cargo box with a pair of opposing side rails, comprising:

a first elongate beam member comprising a first end and a second end, a second elongate beam member of the same length as the first beam member and comprising a first end and a second end, each second end of the beam members including a connecting means for adaptably connecting each second end of the beam members to said cargo box side rails, said connecting means comprising a slot in each second end of the beam members and a bolt extending through each said slot and connecting each said second end to a respective one of said side rails, each said first end of the beam members including joining means whereby the beam first ends are joined together to form a single cross beam assembly which spans the width of the cargo box from one said side rail to the other, said joining means comprising an extension at the first ends of both beam members, each said extension having a different cross sectional area from the respective beam member to which each is attached and including two fastener apertures, the extensions of each beam member being positioned adjacent one another such that the two fastener apertures of each extension are aligned to form two sets of aligned apertures, a bolt extending through each set of aligned apertures and releasably connecting the beam member first ends together such that the beam members may be disassembled for storage, each said elongate beam member further including a plurality of holes for receiving cargo anchoring devices.

* * * * *